Figure 1:
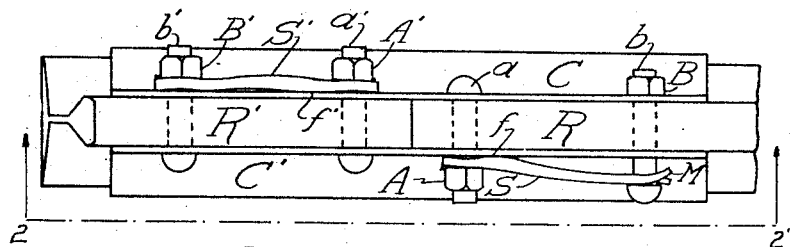

Aug. 2, 1927.

F. C. KRONAUER

RAIL JOINT

Filed March 28, 1927

1,637,449

Frank C. Kronauer
Inventor

Patented Aug. 2, 1927.

1,637,449

UNITED STATES PATENT OFFICE.

FRANK C. KRONAUER, OF GLEN ROCK, NEW JERSEY.

RAIL JOINT.

Application filed March 28, 1927. Serial No. 179,132.

This invention relates to improvements in rail joints of the type commonly used by railroads and in which the component parts of the joint are secured to the rails by bolts.

The objects of the improvements are to provide a device that will;—

Compensate for expansion and elongation of the joint bolts.

Compensate for wear and deterioration at the bearing surfaces of the joint parts and adjacent bearing surfaces of the rails.

Maintain a high elastic pressure between the joint parts and the rails joined thereby.

Provide means for applying and maintaining a holding pressure between the joint parts and the rails joined thereby that is greater than the pressure that can be applied by unaided joint bolts.

Provide means for applying and maintaining the maximum holding pressure at the bolts nearest the ends of the rails joined by the rail joint.

The majority of rail joints in common use are of the bolted type, and comprise essentially angle bars, fish plates or splice plates and other component parts that are secured by bolts to the rails joined. In such a joint any expansion or elongation of the joint bolts, or any appreciable wear or deterioration of the bearing surfaces of the rails or joint parts will, unless compensated for by some means that continuously and effectively forces and holds the component parts of the joint in secure and uniform contact with the rails, eventually result in looseness of the bolted parts, which will in turn cause low joints, battered rail ends and mutilated joint parts. It has also been found that if the joint bolts are tightened too much and sufficient elasticity is not provided by means of a suitable accessory, the joint becomes so rigid that the normal expansion and contraction of the rails due to changes in temperature is resisted to such a degree that high stresses in the rail are set up which may result in the rail being pushed or pulled out of the proper alignment.

Where sufficient elasticity is provided in the rail joint, or where the bolts are not maintained excessively tight, small temperature changes in the rail lengths are taken up by slight longitudinal movements of the adjoining rail ends with respect to the component parts of the rail joint. It has been found desirable to have the two joint bolts nearest the ends of the rails joined, fully tightened to provide maximum support for the rail ends, while those bolts that are further from the rail ends are best maintained at a somewhat lesser tension, provided a suitable means for maintaining a continuous effective holding force between the rail ends and joint parts is introduced.

The functions of the device which is the subject of this invention, are to provide means for attaining the enumerated conditions of elasticity and holding power between the component parts of a bolted rail joint and the rails joined thereby, and it comprises essentially a spring lever which is described as follows.

Figure 2:
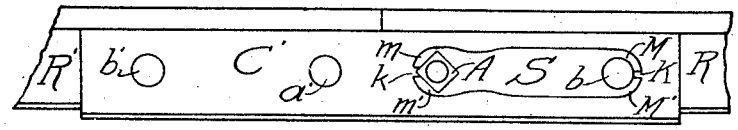
Figure 3:
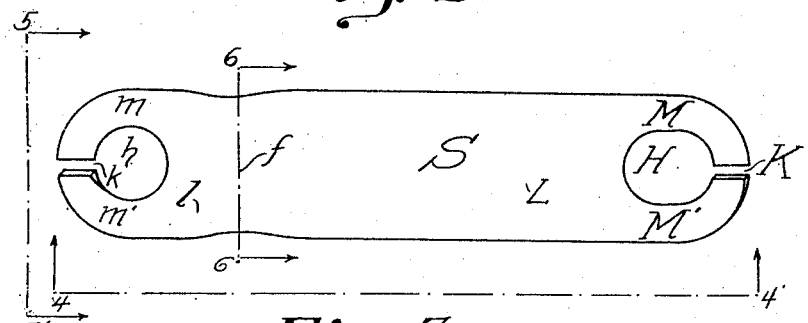
Figure 4:
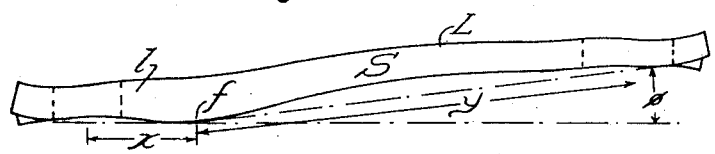
Figure 5:
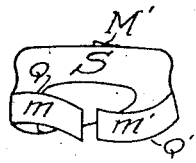
Figure 6:

In the attached drawing similar letters refer to similar parts throughout the several views. Figure 1 is a plan view of a conventional type of a bolted angle bar rail joint connecting two rails, and shows the spring lever in place. Figure 2 is a view of Fig. 1 as seen along the line 2—2' of Fig. 1. Figure 3 is a detached plan view of the spring lever. Figure 4 is a view as seen along the line 4—4' of Fig. 3, and Fig. 5 is an end view of the device as seen along the line 5—5' of Fig. 3. Figure 6 is a section view of Fig. 3 taken along the line 6—6'.

In Fig. 1 the angle bars C and C' are secured to the rails R and R' by the bolts $a$, $b$, $a'$ and $b'$. The spring lever at S is in place with respect to the component parts of the joint, with the nuts A and B of the bolts $a$ and $b$ respectively, sufficiently loose to show the spring lever in its normal unstrained form and position.

The spring lever at S', Fig. 1, is also in place with respect to the component parts of the joint, but with the nuts A' and B' of the bolts $a'$ and $b'$ respectively, fully tightened to compress the spring lever into the form and position for service. In this view it will be observed that the joint bolts $a'$ and $b'$ are shown with their nuts A' and B' respectively, on the same side of the joint, while the joint bolts $a$ and $b$ are shown with their nuts A and B respectively, on opposite sides of the joint. In other words the bolts $a'$ and $b'$ are shown as inserted from the same side of the joint, while the bolts $a$ and $b$ are shown as inserted from opposite sides. In common practice either condition might be found for all bolts of a joint; that is, all bolts would be inserted from one side as are $a'$ and $b'$, or all bolts would be inserted from opposite sides alternately, as are bolts $a$ and $b$. The application of both of these common methods of bolting to the joint in Fig. 1 is shown only for the purpose of illustrating the methods of applying the spring lever in connection with each of the common methods of bolting described.

In applying the spring lever the joint bolts $a$ and $b$, and similarly $a'$ and $b'$, pass respectively through the bolt holes $h$ and H of the spring lever S shown in Fig. 3. The spring lever is preferably made of spring steel, and is shaped as shown in Fig. 4 to form about a junction $f$ as a fulcrum, an angle $\phi$ between the axis of the short lever section $l$, produced, and the axis of the long lever section L, when the spring lever is in a normal unstrained form and position.

The spring lever is arched at $f$, as shown in Fig. 6, for the purpose of increasing the section modulus with respect to the transverse axis of the section, and this provides a rigid fulcrum about which the lever sections $l$ and L can be distorted within the limits of the elasticity of the material of which the spring lever is made, and assume the form shown at S', Fig. 1.

The bolt holes $h$ and H, Fig. 3, are spaced to receive, respectively, the bolts $a$ and $b$, and similarly the bolts $a'$ and $b'$, Fig. 1. Slots $k$ and K are provided and members $m$, M, and $m'$, M' are formed as shown in detail in Figures 3, 4 and 5. As shown in detail in Fig. 5, the members $m$ and $m'$ are shaped to form an auxiliary spring lock comprising a normal spiral spring with superimposed curves. This combination provides an auxiliary spring lock capable of great reactive pressure when compressed. The members M and M' are similarly formed, but no seperate view is included in the drawing to show this.

These auxiliary spring locks are provided for the purpose of increasing the total reactive pressure of the spring lever S against the nuts A, B, A' and B', and also to assist in preventing these nuts from loosening in service when the joint is subjected to the impact and vibrations caused by rolling wheel loads.

When applying the spring lever, illustrated in Figures 1 to 6 inclusive, to a rail joint as shown in Figures 1 and 2, the bolt passing through the short lever section $l$ is first inserted and its nut is applied and partially tightened as shown for the bolt $a$ and its nut A in Fig. 1. The bolt passing through the hole H of the long lever section L is next inserted and its nut is applied and partially turned up as shown for the bolt $b$ and its nut B in Fig. 1. The bolt passing through the hole $h$ in the short lever section $l$, and which was first inserted, is then fully tightened by turning up its nut until the curved portions Q and Q' of the members $m$ and $m'$, Fig. 5, are nearly flattened, as shown for the bolt $a'$ and its nut A' in Fig. 1. The bolt passing through the hole H of the long lever section L, and which was the second bolt inserted, is then tightened, reducing the angle $\phi$ (Fig. 4) until the axes of $l$ and L are nearly in alinement, and flattening the members M and M', as shown for the bolt $b'$ and its nut B' and spring lever S' in Fig. 1.

Considering the high elasticity of the spring steel of which the spring lever is preferably constructed, it is apparent that S' will exert a powerful reactive pressure against the nuts A' and B'. It is also apparent that since bolt $a'$ was first tightened as far as possible before tightening bolt $b'$, the subsequent tightening of bolt $b'$ increased the strain on bolt $a'$ by an amount equal to the pressure required to flatten angle $\phi$ and exerted by bolt $b'$, multiplied by the ratio $\frac{y}{x}$ of the lever lengths $y$ and $x$ of Fig. 4.

Since the bolt $a'$ is located nearest the end of the rail R' the maximum reactive pressure against the angle bars, due to a combination of the lever action previously described and the flattening of the members $m$ and $m'$, is obtained nearest the point desired, namely, the ends of the rails joined; also the elasticity of the spring lever and the relatively large distance through which nut B' in Fig. 1 must travel to compress it through the angle $\phi$, in addition to the distance through which nut A' must travel to compress members $m$ and $m'$, will assure the application of a continuous reactive force to hold the angle bars in secure and uniform contact with the rails joined, and will compensate for any elongation of the joint bolts, and for wear and deterioration of the contacting bearing surfaces of the angle bars and the rails joined.

The application of this device to a four hole angle bar rail joint as shown in Fig. 1 and Fig. 2 is so shown for purpose of illustration only, and it is not desired to limit the application of this device to bolted rail joints of any particular type of joint or any particular number of joint bolts.

While the device illustrated in the attached drawing and described in the foregoing specification embodies the preferred application of my invention, it is possible to alter the construction and features shown and described without departing from the spirit of my invention, and I do not desire to limit the scope of my present application for Letters Patent to the details and type of construction shown and described herein; but I claim:

1. In a rail joint the combination of a spring lever element and joint bolts, in which the said spring lever element consists of two lever sections of unequal lengths that form at their junction with each other a fulcrum about which they act as a lever substantially as described.

2. In a rail joint the combination of a spring lever element and joint bolts, in which the said spring lever consists of two sections of unequal lengths that in their normal unstrained position form an angle with each other, substantially as described.

3. In a rail joint, the combination of a spring lever element and joint bolts, in which the said spring lever consists of two yielding lever sections of unequal lengths, substantially as described.

4. In a rail joint the combination of a spring lever element and joint bolts, in which the said spring lever consists of two lever sections of unequal lengths, each of which is provided with a hole to receive one of the joint bolts, substantially as described.

5. In a rail joint the combination of a spring lever element and joint bolts in which the said spring lever consists of two lever sections of unequal lengths, each of which lever sections is provided with a hole to receive one of the said joint bolts, and in which the area surrounding each hole is slotted and curved to form an auxiliary spring lock, substantially as described.

6. In a rail joint the combination of a spring lever element and joint bolts, in which the said spring lever consists of two lever sections of unequal lengths, forming at their junction a fulcrum, and in which the said lever sections are arched at the said fulcrum to increase the section modulus of the transverse section of the said fulcrum, substantially as described.

7. In a rail joint the combination of a spring lever element and joint bolts, in which the said spring lever is provided with yielding elastic lever sections of unequal lengths, and in which the said lever elements are disposed, with respect to the said joint bolts, so that the bolt passing through the longer of the said lever sections will, by lever action, exert a reactive pressure against the bolt that passes through the shorter lever section, and in which the said reactive pressure transmitted by the longer lever section increases the holding pressure exerted by the bolt that passes through the shorter lever section, substantially as described.

8. In a rail joint the combination of a spring lever element, angle bars and joint bolts, in which the said spring lever element is provided with two lever sections of unequal lengths that at their point of junction with one another form a fulcrum about which they act as a lever, and in which the said spring lever element, joint bolts and angle bars are so arranged, with respect to one another, that the said fulcrum of the spring lever element bears against one of the said angle bars, and concentrates against the said angle bar at the said fulcrum a resultant of forces exerted by the said joint bolts against the said spring lever element, substantially as described.

9. As an article of manufacture, and for use with bolted rail joints, a spring lever element having two yielding elastic lever sections of unequal lengths, a rigid fulcrum formed integral with the said element, a bolt hole in each of the said lever sections, and in which the said bolt holes are spaced at unequal distances from the said rigid fulcrum, and in which the said lever sections, when in a normal unstrained position, form an angle with each other substantially as described.

10. As an article of manufacture and for use with rail joints, a spring lever element having two yielding elastic lever sections of unequal lengths, a rigid fulcrum formed integral with the said element, a bolt hole in each of the said lever sections, a slot at each of the said bolt holes to divide the areas circumscribing the said bolt holes into individual members of auxiliary spring locks, and in which the said auxiliary spring locks are formed as elliptic springs, substantially as described.

11. As an article of manufacture and for use with rail joints, a spring lever element having two yielding elastic lever sections of unequal lengths, a rigid fulcrum formed integral therewith, a bolt hole in each of the said lever sections, auxiliary spring locks circumscribing the said bolt holes, and in which the said lever sections, when in a normal unstrained position, form an angle with one another about the said fulcrum, substantially as described.

FRANK C. KRONAUER.